(12) United States Patent
Wang et al.

(10) Patent No.: US 7,700,390 B2
(45) Date of Patent: Apr. 20, 2010

(54) METHOD FOR FABRICATING THREE-DIMENSIONAL PHOTONIC CRYSTAL

(75) Inventors: Shinan Wang, Kashiwa (JP); Kenji Tamamori, Ebina (JP); Taiko Motoi, Atsugi (JP); Masahiko Okunuki, Akiruno (JP); Haruhito Ono, Minamiashigara (JP); Toshiaki Aiba, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 12/119,168

(22) Filed: May 12, 2008

(65) Prior Publication Data

US 2008/0286892 A1    Nov. 20, 2008

(30) Foreign Application Priority Data

May 15, 2007  (JP) ............................ 2007-128808
Apr. 8, 2008  (JP) ............................ 2008-099949

(51) Int. Cl.
  *H01L 21/00* (2006.01)
  *H01L 21/04* (2006.01)
  *H01L 21/425* (2006.01)
(52) U.S. Cl. ................... 438/31; 438/29; 438/510; 438/514; 257/E21.135; 257/E21.148
(58) Field of Classification Search ................ 438/27, 438/29, 31, 32, 510, 514; 257/E21.135, E21.148
See application file for complete search history.

(56) References Cited

U.S. PATENT DOCUMENTS

| | | | |
|---|---|---|---|
| 5,201,681 A | 4/1993 | Okunuki et al. | 445/24 |
| 5,236,457 A | 8/1993 | Devanathan | 623/16 |
| 5,285,079 A | 2/1994 | Tsukamoto et al. | 257/10 |
| 5,335,240 A | 8/1994 | Ho et al. | 372/39 |
| 5,361,015 A | 11/1994 | Okunuki et al. | 313/309 |
| 5,814,832 A | 9/1998 | Takeda et al. | 257/10 |
| 5,998,298 A | 12/1999 | Fleming et al. | 438/692 |
| 6,002,522 A * | 12/1999 | Todori et al. | 359/573 |
| 2003/0202728 A1 * | 10/2003 | Leonard et al. | 385/5 |
| 2007/0253660 A1 | 11/2007 | Wang et al. | 385/5 |

FOREIGN PATENT DOCUMENTS

JP         2004-219688        5/2004

* cited by examiner

*Primary Examiner*—Alexander G Ghyka
*Assistant Examiner*—Seahvosh J Nikmanesh
(74) *Attorney, Agent, or Firm*—Fitzpatrick, Cella, Harper & Scinto

(57) ABSTRACT

A method for fabricating a three-dimensional photonic crystal comprises the steps of: forming a dielectric thin film; injecting ions selectively into the dielectric thin film by using a focus ion beam to form a mask on the dielectric thin film; forming a pattern by selectively removing an exposed part of the dielectric thin film at which the mask is not formed on the dielectric thin film; forming a sacrificial layer on the dielectric thin film having the pattern formed therein; and flattening the sacrificial layer formed on the dielectric thin film until the pattern comes to the surface.

11 Claims, 3 Drawing Sheets

METHOD FOR FABRICATING THREE-DIMENSIONAL PHOTONIC CRYSTAL

BACKGROUND OF THE INVENTION

1. Field of the Invention

The present invention relates to a method for fabricating a three-dimensional photonic crystal.

2. Description of the Related Art

A photonic crystal is a structural body in which a refraction index of the structure material is periodically distributed, and is an artificial material which can realize a novel function by only devising a structural design.

The greatest feature of the photonic crystal includes that the photonic crystal has a so-called photonic band gap that is a region through which a particular electromagnetic wave cannot pass, and is formed by a difference of refractive indices between components and the periodicity of its structure. An energy level (defect level) caused by a defect is formed in the photonic band gap, by introducing an appropriate defect into the distribution of the refractive index in the photonic crystal. Thereby, the photonic crystal can freely control an electromagnetic wave. Besides, the photonic crystal can further miniaturize the size of a device using the photonic crystal than that of a conventional device.

Furthermore, a three-dimensional photonic crystal has refractive indices of structure materials distributed with three-dimensional periodicity and hardly leaks an electromagnetic wave that exists in a position of the defect outside.

In other words, the three-dimensional photonic crystal is the most suitable material for controlling the transmission of the electromagnetic wave.

Among representative structures of such a three-dimensional photonic crystal, one known structure is a wood pile structure (or rod pile structure) which is disclosed in U.S. Pat. No. 5,335,240. The wood pile structure in the three-dimensional photonic crystal has a structure as is illustrated in FIG. 2.

In FIG. 2, reference numeral 70 denotes a three-dimensional periodic structure in which a plurality of stripe layers are sequentially stacked, in which a plurality of rods 40 are arranged in parallel to each other periodically with a predetermined period in the plane.

Specifically, the three-dimensional periodic structure 70 has four stripe layers including: the first stripe layer in which a plurality of rods are arranged in parallel to each other periodically with a predetermined period in the plane; the second stripe layer in which rods are stacked on the first stripe layer so that the direction can be orthogonal to each rod belonging to the first stripe layer; the third stripe layer in which rods are stacked on the second stripe layer so that the direction can be parallel to each rod belonging to the first stripe layer and the period can be deviated from that in the first stripe layer by only a half of the period in the plane; and the fourth stripe layer in which rods are stacked on the third stripe layer so that the direction can be parallel to each rod belonging to the second stripe layer and the period can be deviated from that in the second stripe layer by only a half of the period in the plane. Then, the three-dimensional periodic structure 70 is structured by sequentially stacking a plurality of sets each of which is formed of the four stripe layers.

The period of the structure of the photonic crystal is approximately a half of a wavelength of an electromagnetic wave to be controlled.

However, the three-dimensional photonic crystal generally has a complicated structure, and needs a complicated process and many steps, though being expected to have ideal device properties.

Conventional methods for fabricating a three-dimensional photonic crystal having a wood pile structure include a method of heat-bonding different members to each other with a laminating technology described below, which is proposed in Japanese Patent Laid-Open No. 2004-219688.

The heat bonding method includes: firstly forming an array of rods which are arranged in parallel to a stripe layer provided on a substrate with a predetermined period in the plane; joining the above described stripe layers with the heat bonding method while aligning the interlayer; and removing the substrate of one stripe layer.

A wood pile structure having layers corresponding to the number of the joining steps can be obtained by repeating the above steps.

The laminating technology described above shall enable the production of the three-dimensional photonic crystal having a relatively complicated structure.

The methods for fabricating the three-dimensional photonic crystal also include the following stacking technology as is disclosed in U.S. Pat. No. 5,998,298.

The above stacking technology includes: forming a thin film; processing the thin film; then, forming a sacrificial layer; and flattening the sacrificial layer until the processed thin film comes to the surface, by polishing the sacrificial layer with a CMP (Chemical Mechanical Polishing) technology.

By repeating the above described process, the stacking technology enables the production of the three-dimensional photonic crystal with higher accuracy than a stacking method which does not employ the sacrificial layer.

On the other hand, as for a conventional method of processing a thin film, U.S. Pat. No. 5,236,457 discloses a method of forming a pattern and a method of fabricating a semiconductor element, as will be described below.

The above method enables the thin film to be processed by a step of injecting an ion beam described below and a step of dry-etching a material to be etched.

Specifically, the step of injecting the ion beam includes: injecting ions into the thin film while changing an injection position on the material to be etched, to which the ion beam is focused, and changing at least one of accelerating voltage, a type of an atom of an ion, and a valence of an ion; and forming a peak region of ion concentration in a depth direction of the material to be etched.

The dry etching step includes dry-etching the material to be etched with such an etching gas as to hardly etch the peak region of the ion concentration because of being inhibited by the ion. The thin film is processed by the above steps.

SUMMARY OF THE INVENTION

However, a laminating method with the use of a heat bonding method as in Japanese Patent Application Laid-Open No. 2004-219688 among the above described conventional methods needs a complicated production process, needs steps proportionally increased to the number of the photonic crystal layers, increases its technological difficulty, lowers its productivity and needs a high cost.

Furthermore, the laminating method causes the deformation of the structure because a heating step and a compression step are necessary whenever layers are laminated and a stress in the structure increases along with the increase of the number of the layers.

Such a structural disarrangement shall decrease the processed accuracy of the photonic crystal.

In addition, a stacking method with the use of a sacrificial layer as in U.S. Pat. No. 5,998,298 among the above described conventional methods can decrease a problem of the laminating method with the use of the above described heat bonding method, but leaves another problem as will be now described below. Specifically, one part of the thin layer formed in the previous step may be damaged because of occasionally coming to the surface in thin-film processing steps for forming second and later layers.

In order to reduce such damage, it is considered to form an etch-stop layer on a part to be protected of the thin film.

However, the method occasionally exerts an influence upon characteristics of the photonic crystal because a gap is formed in the structure when the etch-stop layer is completely removed after the thin films have been processed.

In addition, when the etch-stop layer is partially removed, the etch-stop layer occasionally exerts an influence upon the characteristics of the structure, because the material of the remaining etch-stop layer is different from that of a dielectric which forms the photonic crystal.

For this reason, conventionally, there has been a problem in employing a method of providing the etch-stop layer between thin films.

On the other hand, a conventional method for processing a thin film as shown in U.S. Pat. No. 5,236,457 is considered to be capable of processing a material to be etched in a depth direction, but can process only a part to be seen from the upper face because of not employing a technology such as a sacrificial layer. The above technologies do not solve a problem in fabricating the three-dimensional photonic crystal having a complicated multilayer structure such as a wood pile.

The present invention is designed with respect to the above described problems, and is directed at providing a method for fabricating a three-dimensional photonic crystal which can fabricate a three-dimensional periodic structure with high accuracy and at a low cost.

The present invention is to provide a method for fabricating the three-dimensional photonic crystal including aspects which will be described below, in order to solve the above described problems.

The present invention is directed to a method for fabricating a three-dimensional photonic crystal comprising the steps of: forming a dielectric thin film; injecting ions selectively into the dielectric thin film by using a focus ion beam to form a mask on the dielectric thin film; forming a pattern by selectively removing an exposed part of the dielectric thin film at which the mask is not formed on the dielectric thin film; forming a sacrificial layer on the dielectric thin film having the pattern formed therein; and flattening the sacrificial layer formed on the dielectric thin film until the pattern comes to the surface.

The dielectric thin film can be formed from Si or a Si compound including Si oxide or Si nitride.

Any one selected from the group consisting of a sputtering, a vacuum deposition, a chemical vapor deposition, and an epitaxial growth can be used for forming the dielectric thin film in the film-forming step.

Ga ion can be used as the ion of the focus ion beam in the ion injection step.

A reactive ion etching with a fluorine-based gas can be used for selectively removing the exposed part of the dielectric thin film in the pattern-forming step.

The sacrificial layer in the sacrificial layer-forming step can be formed with a material which is easily flattened in the flattening step.

The sacrificial layer in the sacrificial layer-forming step can be formed by any one selected from the group consisting of a sputtering, a vacuum deposition, a chemical vapor deposition, and an epitaxial growth.

Any one selected from the group consisting of a mechanical polishing and a chemical-mechanical polishing can be used for flattening in the flattening step.

The present invention is directed to a method for fabricating a three-dimensional photonic crystal comprising the steps of: firstly fabricating a structure having a plurality of pattern-formed layers containing sacrificial layers stacked therein, in each of which a plurality of rod-shaped parts are arranged in parallel to each other periodically with a predetermined period in the plane, and secondly fabricating a three-dimensional periodic structure by collectively removing the sacrificial layers in the structure with a liquid etching agent, wherein the first step includes repeating the aforementioned steps sequentially four or more times. The liquid etching agent can contain iron chloride.

The present invention is directed to a method for fabricating a three-dimensional photonic crystal comprising the steps of: filling a three-dimensional photonic crystal fabricated with the just above method as a mold with a material, and removing the mold to prepare a three-dimensional photonic crystal which has a reversed shape of the mold.

The method for fabricating the three-dimensional photonic crystal according to the present invention can realize the production of a three-dimensional periodic structure with high accuracy and at a low cost.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

DESCRIPTION OF THE EMBODIMENTS

Figure 1A:
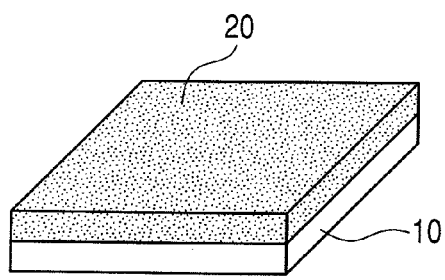
FIGS. 1A, 1B, 1C, 1D, 1E, 1F, 1G, 1H, 1I and 1J are views describing a method for fabricating a three-dimensional periodic structure in an embodiment and Exemplary embodiment 1 according to the present invention.

Preferred embodiments of the present invention will now be described in detail in accordance with the accompanying drawings.

In the following drawings, the same reference numeral will be used for the same element. However, a material, a structure, a shape and a numeric value according to the present invention are not limited to those which are provided here.

FIGS. 1A to 1J illustrate views describing a method for fabricating a three-dimensional photonic crystal in the present embodiment. In FIGS. 1A to 1J, reference numeral 10 denotes a substrate, reference numeral 20 denotes a dielectric thin film, reference numeral 30 denotes an ion-implanted part, and reference numeral 60 denotes a sacrificial layer.

Figure 1B:
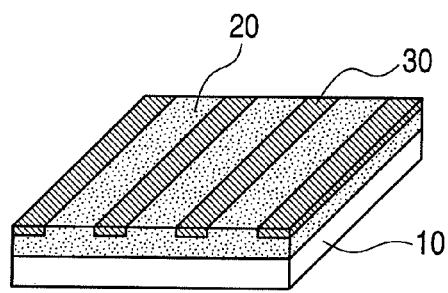
Figure 1C:
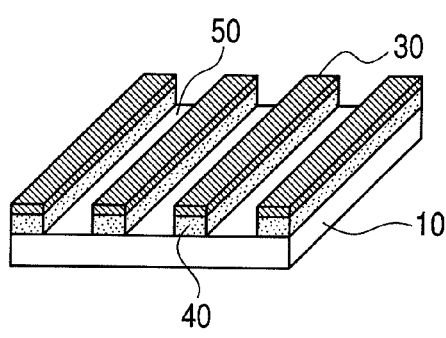
Figure 1D:
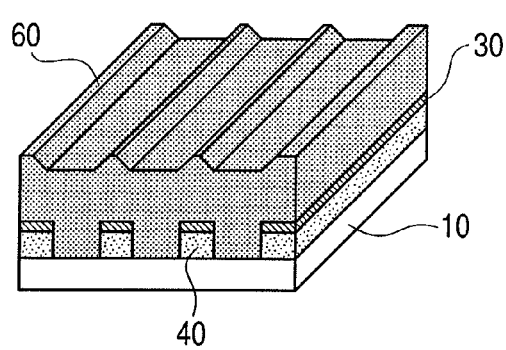
Figure 1E:
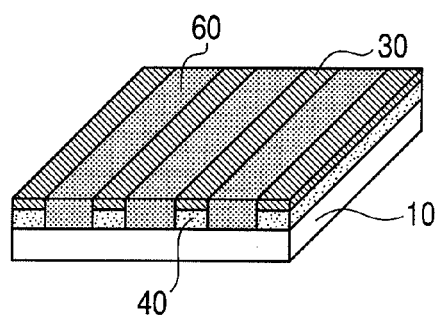
Figure 1F:
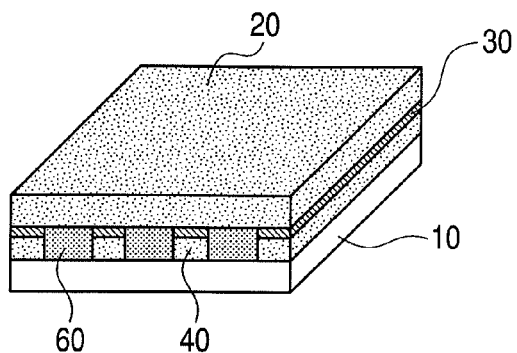
Figure 1G:
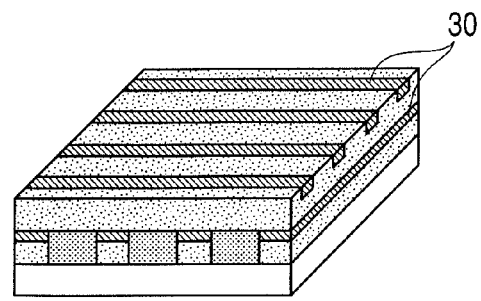
Figure 1H:
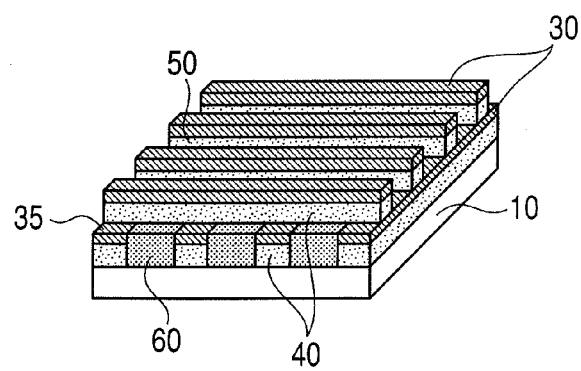
Figure 1I:
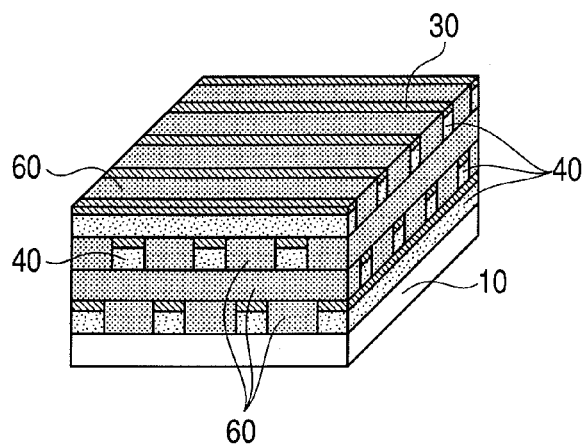
Figure 1J:
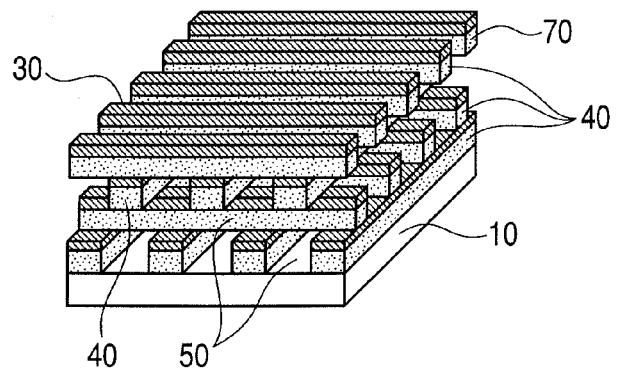
Figure 2:
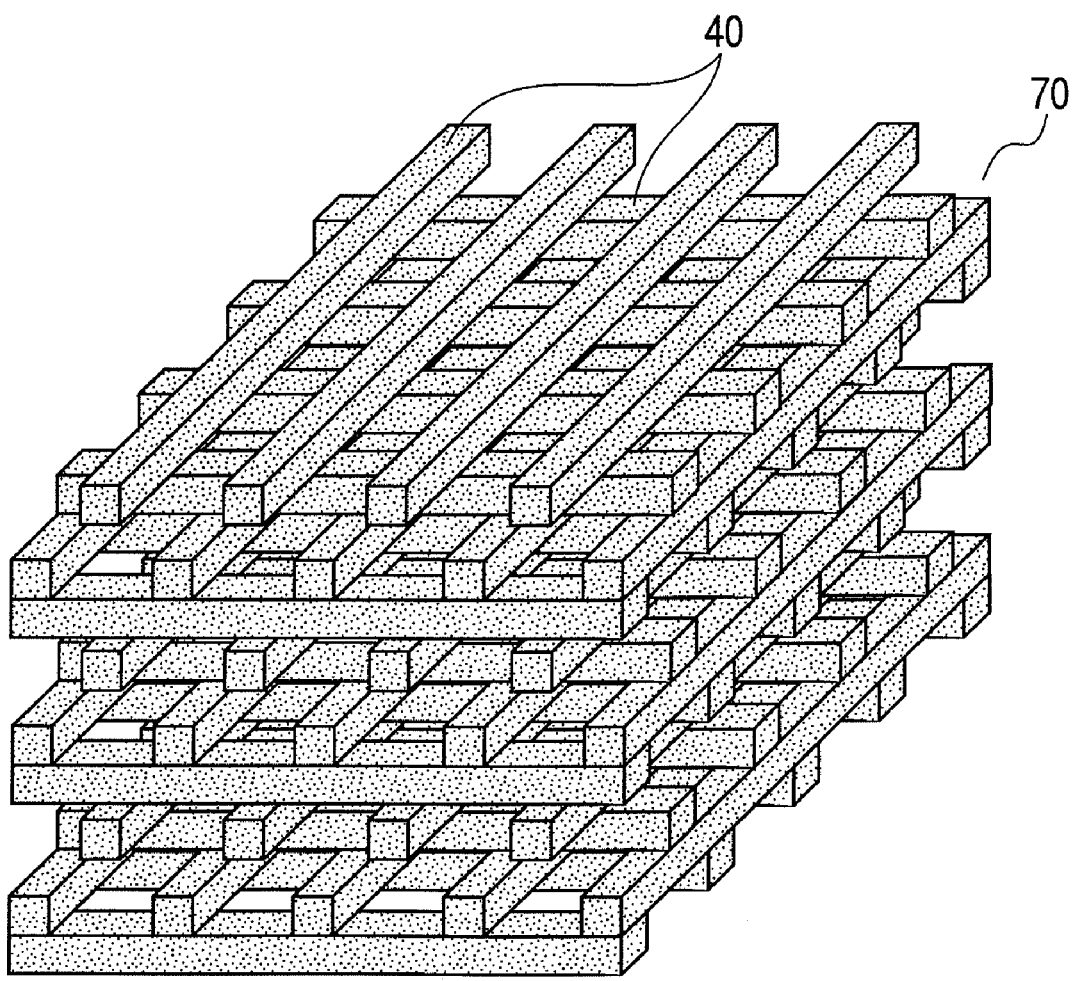
FIG. 2 is a schematic view describing a three-dimensional photonic crystal having a wood pile structure in a conventional example.

A production process in the present embodiment can employ the steps in FIGS. 1A to 1J in order to form the three-dimensional photonic crystal shown in FIG. 1J.

An example of the three-dimensional photonic crystal formed of a wood pile structure will now be described here in order to facilitate the description.

At first, in a step of forming a dielectric thin film, the dielectric thin film 20 is formed which is a primary material comprising a photonic crystal on the substrate 10, as is illustrated in FIG. 1A.

Materials of the dielectrics thin film 20 include a monocrystal Si, an amorphous Si, and Si compounds including Si oxide and Si nitride.

Suitable methods for forming the film include a sputtering method, a vacuum deposition method, a chemical vapor deposition method, and an epitaxial growth method.

The dielectric thin film 20 can be formed into a thickness in a range from several tens of nanometers to several tens of micrometers. The substrate 10 has a flat surface to be film-formed thereon and has adhesiveness to the dielectric thin film 20 to be formed.

The substrate 10 is made from, for instance, a simple substance of quartz, sapphire, glass, an acrylic resin, Si, GaN, GaAs, InP, InGaAs, $TiO_2$ and ZnO, or another material having a thin film thereof. An adhesion layer for improving the adhesiveness may be formed in an interface between the substrate 10 and the first layer of the dielectric thin film 20, as needed.

Next, in an ion injection step, a mask is formed on the above described dielectric thin film by selectively injecting ions into the above described dielectric thin film while using a focus ion beam.

Here, a mask pattern such as reference numeral 30 is formed as illustrated in FIG. 1B, by injecting ions into the above described dielectric thin film 20.

The mask pattern is formed by selectively injecting accelerated Ga ions into the mask pattern 30 in the above described dielectric thin film 20, for instance, while scanning the focus ion beam (FIB).

The type of the ion which can be injected may be In as well as Ga.

A size of the mask pattern 30 may be decided appropriately as needed, but for instance, the width is in a range from several tens of nanometers to several micrometers, and the period in the plane is in a range from several hundreds of nanometers to several micrometers, and the length is in a range from 5 μm to about 1,000 μm. The distribution of the Ga ions in a depth direction is controlled by an accelerating voltage of FIB, the distribution of the Ga ions in the plane (in other words, pattern shape) is controlled by a scanning pattern of FIB, and the density of the Ga ions is controlled by an electric current and an injection period of time of FIB.

When a material of the dielectric thin film 20 and a type of ion (for instance, Ga or In) are determined, the accelerating voltage, the electric current and the injection period of time which are necessary for obtaining the predetermined depth and density can be determined with a simple simulation method, so that the mask pattern portion 30 can be easily formed with high accuracy.

The above described focus ion beam can be one of a single-focused beam and a multi-focused beam, as needed.

An efficiency of ion-arranging step can be further improved by employing the multi-focused beam, independently controlling the accelerating voltages, the electric currents and beam diameters of scanning lines respectively.

Here, the ions may be injected so as to reach only the vicinity of the surface of the dielectric thin film 20. In order to do so, the accelerating voltage of FIB can be in a range from 0.5 kV to 120 kV, and an optimum value is in a range from 1 kV to 30 kV.

The density of ions is practically in a range from $1 \times 10^{18}$ $cm^{-3}$ to $1 \times 10^{23}$ $cm^{-3}$, and can be in an order of $5 \times 10^{20}$ $cm^{-3}$.

The thickness of an ion-implanted layer may be optimized according to a material and an etching depth of a dielectric thin film to be etched and a type of the ion. For instance, when Si is used for the dielectric thin film, the etching depth is set at 10 μm, and Ga ion is employed as an ion to be injected, the ion-implanted layer can have a thickness in a range of 50 nm to 500 nm when the thickness is expressed by projected standard deviation, and can have the thickness of about 100 nm. The thickness is approximately determined by an accelerating voltage for an ion when a material and the ion type of the dielectric thin film is determined, and can be generally predicted by a well-known theoretical calculation technique.

In addition, a peak position of ions in a distribution of the ions in the depth direction can exist in the vicinity of the surface layer of the dielectric thin film when etching controllability is considered. Theoretically, the above described peak position is approximately determined by accelerating voltage for an ion when the material and ion type of the dielectric thin film is determined, and can be generally predicted with a well-known theoretical calculation technique. For instance, ions may be injected into some parts with a low accelerating voltage in the step of forming the mask. The lower is the accelerating voltage, the shallower is the ion-injected depth. Accordingly, the above described peak position can be brought into the vicinity of the surface layer of the dielectric thin film (for instance, within a range of 0 nm to 50 nm or less from the top surface). There is a method other than a method of using a low accelerating voltage, as the following: a method of scraping the surface layer of the dielectric thin film while injecting ions, by adjusting mask forming conditions at the time when a mask is formed by using a FIB, specifically by adjusting accelerating voltage, current density, a way of narrowing an ion beam, and a method and irradiation period of scanning a beam. By doing so, the above described peak position can be brought into the top surface of the dielectric thin film (for instance, within a range of 0 nm to 50 nm or less from the top surface). The depth to be scraped can be continuously adjusted from approximately 0 nm according to the above described mask forming conditions, and can be one-tenth or less of a film thickness of the dielectric thin film.

Next, in a pattern forming step, a pattern is formed by selectively removing a part except the above described ion-implanted part of the dielectric thin film, by using the mask formed on the above described dielectric thin film through the ion injection operation. Specifically, a part except a mask part formed on the dielectric thin film is selectively removed, at which the dielectric thin film comes to the surface.

Here, a part shown by reference numeral 50 is partially removed by etching a dielectric thin film 20 as is illustrated in FIG. 1C.

The dielectric thin film part is selectively removed by using a reactive ion etching (RIE) technique with the use of a fluorine-based gas, for instance. An RIE method of alternately etching the pattern and protecting the side wall of the pattern can be employed particularly when the thickness of the dielectric thin film is 1 μm or more. For instance, when a dielectric thin film is made from Si, the RIE method includes alternately introducing $SF_6$ and $C_4F_8$ gases, and making the respective gases etch the dielectric thin film for a desired period of time. When $SF_6$ gas has been introduced, the gas mainly progresses etching. When $C_4F_8$ gas has been introduced, the gas mainly progresses the protection of the side wall. Thus, the RIE method further improves the etching resistance of the mask, and can reduce the quantity of Ga and mask thickness of the Ga mask. The etching method also can fabricate a pattern having superior perpendicularity. Furthermore, the RIE method with the use of the above described Ga mask can control a tilting angle, a flatness or a shape of the side wall by adjusting a processing condition. The adjustment of the processing condition in the case of alternately carrying out two operations of etching the pattern and protecting the side wall of the pattern means to optimally adjust respective operation periods of time, pressures in an apparatus, processing powers and flow rates of $SF_6$ and $C_4F_8$ gases and the like according the purpose.

At this time, the dielectric thin film part 50 except the above described ion-implanted part which can be seen from a direction approximately perpendicular to the upper surface of the dielectric thin film 20 is selectively removed while the mask pattern 30 illustrated in FIG. 1B, which has been formed in the ion injection step, is used as an etching mask.

The etching operation forms the pattern for the first layer of the photonic crystal.

In the pattern-forming step, the ion-implanted part 30 and the part having no ion implanted therein have greatly different etching resistance.

Due to the difference, the ion-implanted part 30 is not almost etched even when the part having no ion implanted therein is completely removed.

For instance, when the ion-implanted part is formed by injecting approximately $5 \times 10^{20}$ Ga ions $cm^{-3}$ up to the depth of 20 nm from the surface layer of Si, the ion-implanted part shows 500 times or higher etching resistance than the part having no ion implanted therein, in the RIE step with the use of $SF_6$.

Next, in a sacrificial-layer-forming step, a sacrificial layer is formed on the dielectric thin film which has the pattern formed therein in the above described step.

Here, a sacrificial layer thin film 60 is formed on the dielectric thin film containing the structure of the above described first layer, as illustrated in FIG. 1D.

The material for the above described sacrificial layer thin film 60 is selected from materials which are more easily flattened than the above described dielectric thin film 20 and an ion-implanted part 30 in a flattening step which will be described below. For instance, a thin film of copper (Cu) can be employed.

The thickness of the copper thin film can be in a range of 0.1 μm to 5 μm though depending on the type of the pattern of the dielectric thin film. Suitable methods for forming the copper thin film include a sputtering method, a vacuum deposition method, a chemical vapor deposition method and an epitaxial growth method. Hereinafter the above step is referred to as a sacrificial-layer-forming step.

Next, in a flattening step, the sacrificial layer formed on the above described dielectric thin film is flattened until the above described pattern comes to the surface.

Here, as illustrated in FIG. 1E, the above described sacrificial layer thin film is flattened.

The flattening operation is performed so that the dielectric thin film pattern of a substrate, that is to say, the ion-implanted part 30 comes to the surface and the copper thin film 60 reaches to approximately the same height as the ion-implanted part 30.

The examples of a technique to be employed in the above described flattening operation include a mechanical polishing technique and a chemical-mechanical polishing technique (CMP).

Next, a structure containing the sacrificial layer as illustrated in FIG. 1I can be obtained by repeating the above described film-forming step, ion injection step, pattern-forming step, sacrificial-layer-forming step and flattening step which are illustrated in FIGS. 1F to 1I, by a predetermined number of times.

In other words, the structure for obtaining one period of a wood pile structure can be obtained by repeating the above described steps for four times, which has a plurality of pattern-formed layers containing sacrificial layers stacked therein, in each of which a plurality of rod-shaped parts are arranged in parallel to each other periodically with a predetermined period in the plane.

Specifically, a structure having pattern-forming layers containing sacrificial layers as shown in FIG. 1I stacked therein is fabricated by the process which will be described below, while using each step for fabricating the above described three-dimensional photonic crystal.

More specifically, a structure that contains the above described sacrificial layers and has pattern-forming layers stacked therein, in each of which a plurality of rod-shaped parts are arranged in parallel to each other periodically with a predetermined period in the plane, is fabricated by repeating the above described film-forming step, ion injection step, pattern-forming step, sacrificial-layer-forming step and flattening step sequentially four or more times.

At this time, the first pattern-forming layer in which a plurality of the rod-shaped parts are arranged in parallel to each other periodically with a predetermined period in the plane is formed through the above described film-forming step, ion injection step, pattern-forming step and sacrificial-layer-forming step, in the first process.

Subsequently, the second pattern-forming layer having rod-shaped parts which extend to a direction orthogonal to each rod-shaped part formed on each rod-shaped part in the above described first pattern-forming layer is formed through the above described film-forming step, ion injection step, pattern-forming step and sacrificial-layer-forming step, in the second process.

Subsequently, the third pattern-forming layer having rod-shaped parts positioned so that the direction can be parallel to that of the rod-shaped parts formed in the above described first pattern-forming layer and the period can be deviated from that of the rod-shaped parts formed in the above described first pattern-forming layer by only a half of the period in the plane is formed on the above described second pattern-forming layer, in the third process.

The fourth stripe layer having rod-shaped parts positioned so that the direction can be parallel to each rod-shaped part in the above described second pattern-forming layer and the period can be deviated from that in the above described second pattern-forming layer by only a half of the period in the plane is formed on the above described third pattern-forming layer, in the fourth process.

Through the above processes, the above described structure for obtaining one period of the wood pile structure can be obtained.

However, when the top layer of the dielectric thin film pattern is formed, the above described sacrificial-layer-forming step and the above described flattening step may be omitted.

In order to align pattern positions among layers with high accuracy, a pattern position of each layer may be determined with respect to an alignment mark (not shown) formed on a substrate and a dielectric thin film beforehand.

The above described mark for aligning the position can be formed by using one of a photolithographic technique and a lift off technique, for instance. Materials of the mark for aligning the position include Au/Cr.

Here, it should be noted that a substrate pattern comes to the surface in a subsequent pattern-forming step for forming the second and later layers (FIG. 1H).

For instance, when a pattern processing operation for the second layer proceeds to the bottom of the dielectric thin film of the second layer in FIG. 1H, a part of the pattern of the first layer to be the substrate (for instance, part shown by reference numeral 35) comes to the surface.

Usually, the end point of a pattern processing operation is controlled by an operation period of time, so that it is difficult to stop the pattern processing operation without exposing even a little part of an exposed part 35 of the pattern to an etching atmosphere. Conventionally, it has been difficult to provide an etch-stop layer, so that the exposed part 35 of the pattern is generally damaged.

The damage decreases processing accuracy for a photonic crystal structure, and affects characteristics of the element.

In contrast to this, the production method according to the present invention imparts high etching resistance to the above described exposed part 35 of the pattern by previously injecting Ga ions into the part.

In other words, an etching mask is embedded in the inner part of the dielectric thin film with an ion injection technique. The built-in mask does not obstruct the structure formation of the second and later layers, and accordingly needs not be removed even after a thin film has been processed.

The mask can protect a structure of the thin film while working as the etch-stop layer even in the processing operation for subsequent and later layers. Thereby, damage during the processing operation can be reduced, and higher processing accuracy can be obtained.

Subsequently, the above described sacrificial layer in a photonic crystal structure containing the sacrificial layer of FIG. 1I is collectively removed with a liquid etching agent in the step of removing the sacrificial layer, so as to obtain a three-dimensional periodic structure illustrated in FIG. 1J. Thereby, a desired photonic crystal can be obtained.

The above described liquid etching agent can employ, for instance, an etching solution containing iron chloride when the above described sacrificial layer is made from Cu.

Through the above stacking process, a three-dimensional photonic structure made from the dielectric thin film, especially, Si or a Si compound including Si oxide or Si nitride is fabricated.

As described above, a mask for processing a dielectric thin film according to the present embodiment is embedded in a thin film with an ion injection technique, does not obstruct the structure formation of the second and later layers, and accordingly needs not be removed even after a thin film has been processed.

The mask can protect a structure of the thin film while working as an etch-stop layer even in the processing operation for subsequent and later layers.

Thereby, damage during the processing operation can be reduced, and higher processing accuracy can be obtained.

In addition, a method for fabricating a three-dimensional photonic crystal according to the present invention can reduce a fabricating cost as well, because the production method consists of simpler steps than a prior art.

In the above description, only a three-dimensional photonic crystal having a three-dimensional wood pile structure was described, but the present invention is not limited to the above three-dimensional structure. Another three-dimensional structure can be easily fabricated according to the present invention.

EXEMPLARY EMBODIMENTS

An exemplary embodiment of the present invention will now be described below, but the present invention is not limited to these exemplary embodiments.

Exemplary Embodiment 1

The present exemplary embodiment will be described with reference to FIGS. 1A to 1J because the present exemplary embodiment basically includes the same steps as in a method for fabricating a three-dimensional photonic crystal described in the above embodiment according to the present invention. Description on figures of an overlapping part with the above described embodiment according to the present invention will be omitted.

In the present embodiment, a wood pile type three-dimensional photonic crystal structure illustrated in FIG. 1J was fabricated.

At first, a film-forming step illustrated in FIG. 1A is performed. In the step, a dielectric thin film 20 which is a main material composing the photonic crystal is formed on a substrate 10.

Quartz was used for the above described substrate 10. The dielectric thin film 20 of a Si thin film was formed into a thickness of approximately 100 nm by using a sputtering technique.

Next, an ion injection step illustrated in FIG. 1B is performed. The step includes selectively injecting Ga ions into a part of the pattern 30 while scanning a focus ion beam (hereinafter referred to as FIB). As for the size of the pattern 30, the width is approximately 100 nm, the length is 100 μm and the period in the plane is approximately 300 nm. The whole area of the pattern is approximately 100 μm square.

Ga ions are almost uniformly injected down to a depth of approximately 30 nm of the Si thin film from the top surface, through the FIB which has been set at accelerating voltage in a range of approximately 5 kV to 30 kV.

The highest density of the Ga ions is controlled to approximately $5 \times 10^{20}$ cm$^{-3}$ by focusing the beam diameter of the FIB into approximately 10 nm and adjusting the beam current and the scanning speed.

Next, a pattern-forming step illustrated in FIG. 1C is performed. In the step, a part shown by reference numeral 50 is partially removed by etching a Si thin film 20 with an RIE method with the use of a fluorine-based gas.

At this time, the part 50 which has no Ga ion implanted therein and can be seen from a direction approximately perpendicular to the upper surface of the Si thin film 20 is selectively removed while the pattern 30 illustrated in FIG. 1B, which has been formed in the ion injection step, is used as an etching mask. The etching operation forms the pattern for the first layer of the photonic crystal. The RIE method includes alternately introducing, for instance, $SF_6$ and $C_4F_8$ gases onto the Si thin film 20. When $SF_6$ gas has been introduced, the gas mainly progresses etching. When $C_4F_8$ gas has been introduced, the gas mainly progresses the protection of the side wall. Thus, the RIE method further improves the etching resistance of the mask, and can reduce the quantity of Ga and mask thickness of the Ga mask.

In the pattern-forming step, the Ga ion-implanted part 30 can acquire 500 times or higher etching resistance than the part 50 having no Ga ion implanted therein.

Next, a step of forming a sacrificial layer illustrated in FIG. 1D is performed.

In this step, a copper thin film 60 is formed on a Si thin film containing a structure of the above described first layer, as a sacrificial layer thin film. The copper thin film is deposited into the thickness of approximately 0.3 μm with a sputtering method.

Next, a flattening step is performed as is illustrated in FIG. 1E. In the step, the copper thin film 60 is polished with a well-known CMP method so that the height of the copper thin film 60 can reach to approximately the same height of the pattern 30 of the Si thin film of the substrate by making the pattern 30 come to the surface.

Next, a photonic crystal structure containing a sacrificial layer as illustrated in FIG. 1I is fabricated by repeating the above described film-forming step, ion injection step, pattern-forming step, sacrificial-layer-forming step and flattening step, which are illustrated in FIGS. 1F to 1I.

In order to align pattern positions among layers with high accuracy, an alignment mark (not shown) is formed on the substrate 10 beforehand. A pattern position of each layer is determined with respect to the alignment mark.

The above described alignment mark is formed by using a photolithographic technique and a lift-off technique. A material for the alignment mark is Au (thickness of 100 nm)/Cr (thickness of 10 nm).

When a pattern processing operation for the second layer proceeds to the bottom of the Si thin film of the second layer in a step of forming a pattern shown in FIG. 1H, a part of the pattern of the first layer to be the substrate (for instance, part shown by reference numeral 35) comes to the surface.

Usually, the end point of a pattern processing operation is controlled by an operation period of time, so that it is difficult to stop the pattern processing operation without exposing even a little part of an exposed part 35 of the pattern to an etching atmosphere.

Conventionally, it has been difficult to provide an etch-stop layer, so that the exposed part 35 of the pattern is generally damaged. The damage decreases processing accuracy for a photonic crystal structure, and affects characteristics of the element.

In contrast to this, the production method according to the present invention imparts high etching resistance to the parts (parts shown by reference numerals 30 and 35) by previously injecting Ga ions into the parts to be pattern-formed.

In other words, an etching mask is embedded in the inner part of the Si thin film with an ion injection technique.

The built-in mask does not obstruct the structure formation of the second and later layers, and accordingly needs not be removed even after a thin film has been processed. The mask can protect a structure of the thin film while working as the etch-stop layer even in the processing operation for subsequent and later layers.

In FIG. 1H, the part 35 comes to the surface, but causes a processing damage little because the part has high etching resistance.

As a result, the production method according to the present embodiment can show higher processing accuracy than a conventional processing method which does not use an etch-stop layer.

Subsequently, a step of removing a sacrificial layer is performed in order to obtain a three-dimensional structure illustrated in FIG. 1J. A desired wood pile type three-dimensional photonic crystal is obtained in the step by collectively removing the above described sacrificial layer in a structure of FIG. 1I with an etching solution containing iron chloride.

FIG. 1J illustrates a wood pile type photonic crystal of one period (four layers).

Through the above stacking steps, a three-dimensional structure which is represented by a three-dimensional photonic crystal can be fabricated with higher processing accuracy and at a lower cost.

Exemplary Embodiment 2

In Exemplary embodiment 2, a method of fabricating a three-dimensional periodic structure by using a three-dimensional photonic crystal which has been fabricated by the above described method for fabricating the three-dimensional photonic crystal as a production mold will be described.

In the present embodiment, a new photonic crystal structure is fabricated by using a photonic crystal 70 as a production die, which has been fabricated in Exemplary embodiment 1.

The production method includes, at first, filling atmospheric sections 50 among rods 40 of the photonic crystal 70 with another material by using a chemical vapor deposition (CVD) technique or an atomic layer deposition (ALD) technique.

The above described material is titanium oxide ($TiO_2$), for instance. The production method can densely fill the above described atmospheric section 50 with the material so as not to leave interstices, by optimizing the filling conditions.

Then, the production method includes partially exposing rods positioned in the most external part among the above described rods 40, by using a polishing technique or a dry etching technique; and completely removing the rods 40 (Si) with the dry etching technique or an etching solution.

There is a dry etching technique with the use of $XeF_2$ gas, in the dry etching techniques. A solution which can be used the etching solution may be any solution as long as the solution dissolves Si but does not etch $TiO_2$ and a substrate made from quartz.

For instance, a TMAH (tetramethyl ammonium hydroxide) solution can be employed. A three-dimensional photonic crystal made from $TiO_2$ is fabricated through the above described process.

Furthermore, a material such as GaN, $SiO_2$ and ZnO can be employed in place of $TiO_2$. Filling and other steps slightly vary depending on each material, but it is obvious that the new photonic crystal structure can be fabricated from any material.

In the above description, a substrate 10 is made from quartz, but there is no problem in changing the material as needed.

A three-dimensional periodic structure which is made from the filled material and has a reversed shape of the above described production mold can be fabricated with the above described method by: filling the production mold with a material for forming the three-dimensional photonic crystal; and removing the production die.

Thereby, a photonic crystal made from a material completely different from that of the photonic crystal of Si, which has been formed in stacking steps shown in Exemplary embodiment 1, can be formed.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-128808, filed May 15, 2007, and Japanese Patent Application No. 2008-099949, filed Apr. 8, 2008 which are hereby incorporated by reference herein in their entirety.

What is claimed is:

1. A method for fabricating a three-dimensional photonic crystal comprising the steps of:
  forming a dielectric thin film;
  injecting ions selectively into the dielectric thin film by using a focus ion beam to form a mask on the dielectric thin film;
  forming a pattern by selectively removing an exposed part of the dielectric thin film at which the mask is not formed on the dielectric thin film;
  forming a sacrificial layer on the dielectric thin film having the pattern formed therein; and
  flattening the sacrificial layer formed on the dielectric thin film until the pattern comes to the surface.

2. The method for fabricating the three-dimensional photonic crystal according to claim 1, wherein the dielectric thin film is formed from Si or a Si compound including Si oxide or Si nitride.

3. The method for fabricating the three-dimensional photonic crystal according to claim 1, wherein any one selected from the group consisting of a sputtering, a vacuum deposition, a chemical vapor deposition, and an epitaxial growth is used for forming the dielectric thin film in the film-forming step.

4. The method for fabricating the three-dimensional photonic crystal according to claim 1, wherein Ga ion is used as the ion of the focus ion beam in the ion injection step.

5. The method for fabricating the three-dimensional photonic crystal according to claim 1, wherein a reactive ion etching with a fluorine-based gas is used for selectively removing the exposed part of the dielectric thin film in the pattern-forming step.

6. The method for fabricating the three-dimensional photonic crystal according to claim 1, wherein the sacrificial layer in the sacrificial layer-forming step is formed with a material which is easily flattened in the flattening step.

7. The method for fabricating the three-dimensional photonic crystal according to claim 1, wherein the sacrificial layer in the sacrificial layer-forming step is formed by any one selected from the group consisting of a sputtering, a vacuum deposition, a chemical vapor deposition, and an epitaxial growth.

8. The method for fabricating the three-dimensional photonic crystal according to claim 1, wherein any one selected from the group consisting of a mechanical polishing and a chemical-mechanical polishing is used for flattening in the flattening step.

9. A method for fabricating a three-dimensional photonic crystal comprising the steps of:
  firstly fabricating a structure having a plurality of pattern-formed layers containing sacrificial layers stacked therein, in each of which a plurality of rod-shaped parts are arranged in parallel to each other periodically with a predetermined period in the plane, and
  secondly fabricating a three-dimensional periodic structure by collectively removing the sacrificial layers in the structure with a liquid etching agent, wherein
  the first step includes repeating the following steps sequentially four or more times:
  forming a dielectric thin film; injecting ions selectively into the dielectric thin film by using a focus ion beam to form a mask on the dielectric thin film;
  forming a pattern by selectively removing an exposed part of the dielectric thin film at which the mask is not formed on the dielectric thin film;
  forming a sacrificial layer on the dielectric thin film having the pattern formed therein; and
  flattening the sacrificial layer formed on the dielectric thin film until the pattern comes to the surface.

10. The method for fabricating the three-dimensional photonic crystal according to claim 9, wherein the liquid etching agent contains iron chloride.

11. A method for fabricating a three-dimensional photonic crystal comprising the steps of:
  filling a three-dimensional photonic crystal fabricated with the method according to claim 9 as a mold with a material, and
  removing the mold to prepare a three-dimensional photonic crystal which has a reversed shape of the mold.

* * * * *